United States Patent [19]

Wolf et al.

[11] Patent Number: 5,700,000
[45] Date of Patent: Dec. 23, 1997

[54] TRANSVERSELY COMPLIANT BODY SPRING FOR A HYDRAULIC BEARING

[75] Inventors: Franz Josef Wolf, Bad Soden-Salmunster; Martin Mohr, Brachrak-Udenhain; Stefan Nix, Wachtersbach-Aufenau, all of Germany

[73] Assignee: Woco Franz-Josef Wolf & Co., Bad Soden-Salmunster, Germany

[21] Appl. No.: 480,749

[22] Filed: Jun. 7, 1995

[30] Foreign Application Priority Data

Jul. 27, 1994 [DE] Germany ............... 44 26 588.3

[51] Int. Cl.$^6$ .................................................. F16M 5/00
[52] U.S. Cl. ...................................... 267/140.13; 367/219
[58] Field of Search ........................... 267/140.13, 153, 267/141.2, 292, 293, 219, 220; 248/562, 636; 180/300, 312

[56] References Cited

U.S. PATENT DOCUMENTS

| | | | |
|---|---|---|---|
| 4,630,803 | 12/1986 | Werner et al. | 267/219 |
| 4,750,719 | 6/1988 | Hartel | 267/140.13 |
| 4,840,359 | 6/1989 | Hamaekers et al. | 267/219 X |
| 5,014,967 | 5/1991 | Wolf et al. | 267/292 |
| 5,026,031 | 6/1991 | Court | 267/219 |
| 5,110,660 | 5/1992 | Wolf et al. | 267/292 |
| 5,158,269 | 10/1992 | Hein et al. | 267/292 |

FOREIGN PATENT DOCUMENTS

| | | | |
|---|---|---|---|
| 2524951 | 10/1983 | Germany | 267/140.13 |
| 2171774 | 9/1986 | Germany | 267/140.13 |
| 4139049 | 6/1993 | Germany | 267/140.13 |

*Primary Examiner*—Lee W. Young
*Attorney, Agent, or Firm*—Lowe, Price, LeBlanc & Becker

[57] ABSTRACT

The invention in directed to a bearing to damp oscillatory masses and includes a rubber-elastic support body, a receiving device mounted at and/or in the support device and connecting the bearing to the oscillatory mass, and a housing frictionally bracing the support body against a mount. The support body is fitted in such manner with at least one clearance extending substantially in the axial direction of the support body that when the bearing is loaded statically, the outer walls of the clearance are mutually apart.

8 Claims, 2 Drawing Sheets

TRANSVERSELY COMPLIANT BODY SPRING FOR A HYDRAULIC BEARING

BACKGROUND OF THE INVENTION

The present invention concerns a bearing to damp oscillatory masses and comprising a rubber-elastic bearing body.

Such bearings are used wherever the oscillations of a mass must be minimized, that is, its amplitude of oscillations must be damped. At the same time such bearings must be able to control the noise-envelope generated by said oscillations and transmitted by the bodies to the ambient air.

A typical application of such bearings is to automotive engineering where personal comfort is increasingly important. Such bearings are frequently used as engine bearings that transmit both static and dynamic loads into the vehicle body.

The static load is caused by the weight of the engine, whereas the dynamic load is induced in many ways by oscillations of the engine. Illustratively, engine start-up or engine travel over rough terrain causes lowfrequency shaking with large amplitudes, whereas engine operation at high rpms leads to high-frequency vibrations with small amplitudes.

Because of the personal high-comfort requirements, such bearings must control the amplitudes of shaking and vibrations transmitted in all three directions in space in this bearing.

It is clear from the above that the characteristic lines of the damping effect of such engine bearings must be independently adjustable from one another for damping in the case of a load in the axial longitudinal direction of the bearing and in the case of a load transverse to this axial, longitudinal bearing direction, i.e, a radial bearing direction.

There is available a hydraulically damped engine bearing having an in-between ring. The rubber-elastic support body of this known bearing comprises a preferably metallic insert in the region of its frustoconically outwardly extending base, said insert extending transversely to the force direction in the support body and preventing bending of the outwardly directed support-body base in either direction. As a result, it is possible to adjust different elastic spring characteristics axially and radially in the known bearing. Such known bearings furthermore evince good acoustic behavior, that is a low dynamic spring constant, but on the other hand, these known bearings have the drawback that a material bond in the form of expensive vulcanization must be implemented between the support body, which typically is rubber, and the metal ring, thus incurring substantial costs. The latter consideration is highly significant because such bearings when used for motor vehicles are subject to price-pressures of a mass-production environment and therefore they can only be used in higher-price products.

Moreover, a further drawback of these known bearings is high notching stresses, that is, high shears or strains occurring in the area of the interface between the rubber-elastic bearing body and the metallic insert-ring, said stresses resulting in failure of the known bearing and thereby to shortened life.

While the insert ring may be omitted and the problem of shearing may thus be remedied, and furthermore lower manufacturing costs also being achieved thereby, such omission however entails the drawback that such a bearing body evinces a fixed spring characteristic ratio in the axial to radial directions. The result is more noise, for instance, in the interior of the vehicle because this bearing support-body must be designed for the maximum possible loads and thus is susceptible to shaking and hence is no longer able to effectively damp small vibrational amplitudes. The resulting noise so generated can propagate unhindered into the vehicle.

Accordingly it is the object of the present invention to eliminate the above described drawbacks by creating a bearing to damp oscillatory masses which makes it possible to adjust both the strength and the acoustics radially and axially in an independent manner, with said bearing being economical and moreover evincing long life.

SUMMARY OF THE INVENTION

The invention provides a bearing which damps oscillatory masses and comprising a rubber-elastic support body, a receiving device mounted on and/or in the support body to connect the bearing to the oscillatory mass and a housing frictionally bracing the support body against a mount. The support body comprises at least one clearance extending substantially in its axial direction and of which the outer walls run mutually apart when the bearing is statically loaded.

As a result, adjustability of the bearing characteristics for axial or radial loading is advantageously achieved because, when statically loaded, this bearing will be compliant in its longitudinal direction. The rubber-elastic support body is also able to easily deform in its radial direction and thus can effectively damp oscillatory loads in that direction. The spring characteristics are controllable by means of the size and shape of the clearance running substantially in the material-body longitudinal direction.

The invention provides that the clearance be composed of substantially circular cylindrical cavities extending from one face of the support body toward the other face and arranged around the said receiving device. Thus, the arrangement and positions of the individual, circular cylindrical cavities around the receiving device allow independent adjustments of both axial and radial bearing compliances because, for such purposes, i.e., for a circular cylindrical support body, such cavities are arranged in the zone of an axial longitudinal sectional plane of the support body, whereas a continuous support body is selected in the zone of an axial sectional plane perpendicular to the axial longitudinal sectional plane, that is, in the latter case, a support body free of cavities. Consequently, the bearing fitted with this support body is more compliant in the direction of the axial longitudinal sectional plane comprising cavities than in the direction of that axial longitudinal plane lacking cavities.

In a preferred embodiment the cavities may be disposed along an arc of a circle at and/or in the support body. For instance, the cavities may be arrayed concentrically around the receiving device of the bearing or, alternately, they may merely be arrayed along part of the periphery of this circle which is concentric with the receiving device.

In yet another preferred embodiment, the cavities touch or intersect at their outer peripheries. As a result, the most varied forms of clearances may be achieved in the support body depending on which spring characteristics of the bearing so formed are required in the axial and radial directions.

In accordance with another aspect of the invention, at least one radially outwardly extending clearance is provided at that support-body face which is opposite the support-body face comprising the clearances running in the axial direction of the support body. The at least one radially outward clearance is angularly offset in the support-body axial longitudinal direction relative to those clearances which run in the support-body axial longitudinal direction.

Hence, the support body is such that it comprises clearances running in its longitudinal direction and for instance running from one support-body face into this support body along its longitudinal direction but without reaching the zone of the face opposite the first-mentioned face. A further clearance is present in the region below the ends of said first clearances running in the support-body axial longitudinal direction and extends transversely to the latter with respect to which it is angularly offset and thereby will not be located directly underneath them.

Consequently and advantageously, in the case already mentioned of oscillatory loads both in the support-body's axial longitudinal and radial directions, for instance in the case of a self-aligning bearing and the accompanying radial forces, the radial displacements will not result in excessive stretching and excessive tensions in the support body. Greater compliance is imparted by this radial clearance to the support body in its radial direction, reducing the tendency of the support body to harden and hence to become hard, and advantageously in the case of dynamic loading, a low dynamic spring constant is obtained because of the resulting enlarged spring displacement, whereby finally good acoustic insulation and thus high noise damping is achieved for this bearing.

In accordance with a further preferred aspect of the invention, the radial clearance extends from the vicinity of the receiving device at and/or in the support body radially outward to near an outer surface of this support body, its radially inward wall being of the same or of a different height than its radially outside wall. Moreover the support body may be such that its radial clearance is symmetrical to its axial longitudinal sectional plane, such that it extends in the zone of one support-body face over substantially this support-body's full diameter. Advantageously thereby the radial spring characteristics of the bearing so formed are adjustable even for different designs of the support body.

The radial clearance near the receiving device may be of the same or of a different cross-sectional surface than when near the outer surface of the support body. As a result the elastic characteristics of the bearing so formed when being radially loaded can be monotonely rising or falling.

The support body of the invention may be the support body of a hydraulically damped bearing, that is, it may be the body spring of a so-called hydraulic bearing.

BRIEF DESCRIPTION OF THE DRAWINGS

The invention is elucidated below in relation to the drawing.

DETAILED DESCRIPTION OF THE PREFERRED EMBODIMENTS

Figure 1:
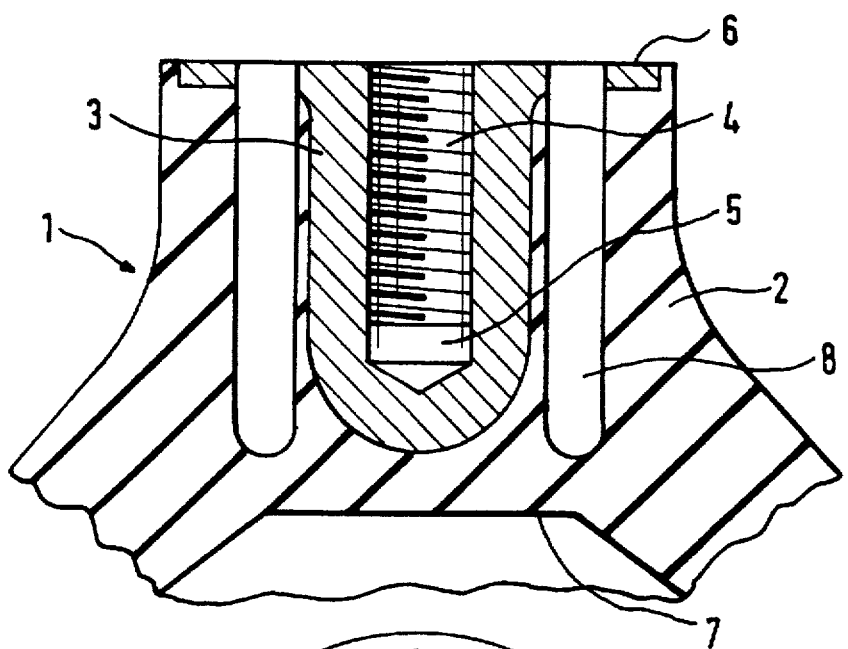
FIG. 1 is an axial section of a support body of the invention.

As shown by a schematic axial representation of a bearing in FIG. 1, a bearing 1 essentially comprises a rubber-elastic support body 2 concentric with a receiving device 3 mounted inside support body 2. Receiving device 3 is metallic and is fitted with a borehole 5 comprising an inner thread 4, and it serves to mount an oscillatory or vibratory mass which, in the shown embodiment, may be an omitted internal-combustion engine.

FIG. 1 further shows clearances in the form of circular cylindrical cavities 8 similar to boreholes in support body 2 of bearing 1 in the vicinity of receiving device 3, the cavities running from a upper face 6 of the support body in the direction of the support-body face 7 opposite face 6.

Figure 2:
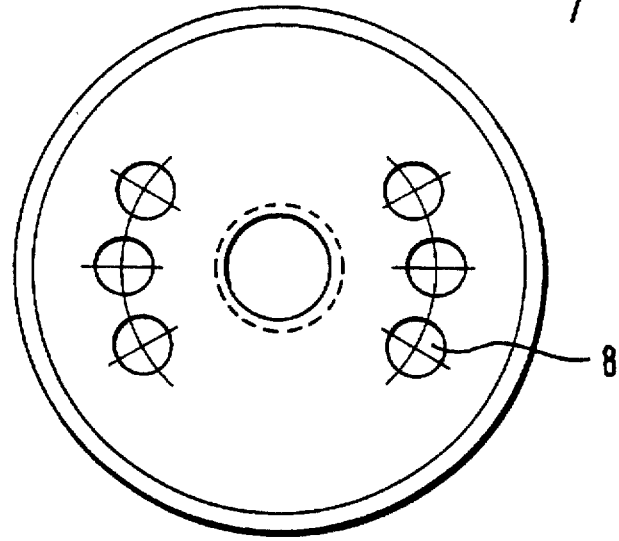
FIG. 2 is a topview of a first embodiment.

As shown in further detail in FIG. 2, the clearances in the form of circular cylindrical cavities 8 are arranged equidistantly along each of two 60° arcs of circle concentric with borehole 5. Advantageously thereby support body 2 shall also evince significant compliance when loaded in its axial longitudinal direction which it possesses furthermore in similar manner in the case of radial loading in the direction of the axial longitudinal center plane fitted with cavities 8. On the other hand, support body 2 is less compliant in the direction of the plane perpendicular to the above mentioned axial longitudinal center plane.

Figure 3:
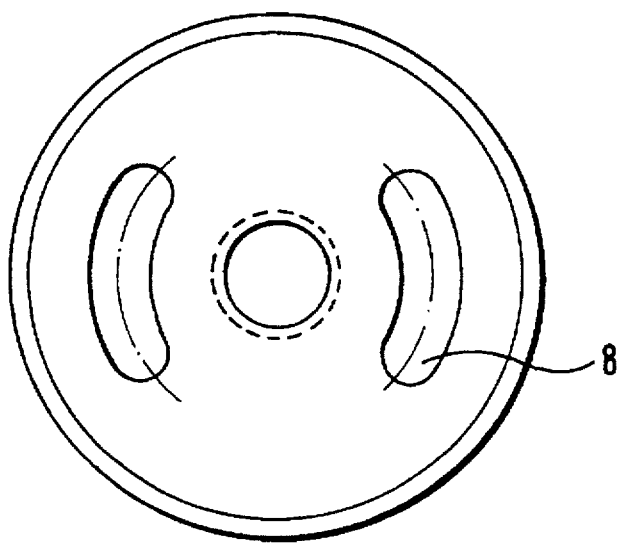
FIG. 3 is a topview of a second embodiment.

The spring-hardness of bearing 1 comprising support body 2 may be varied further in arranging cavities 8 such that the cavities intersect, as shown on the right side of FIG. 2, or merge into one another, as shown in FIG. 3, whereby a clearance is formed by the cavity 8 on both sides radially of borehole 5, whereas the bearing will be less compliant in the direction of a load perpendicular to the plane in which these cavities 8 are located.

Figure 4:
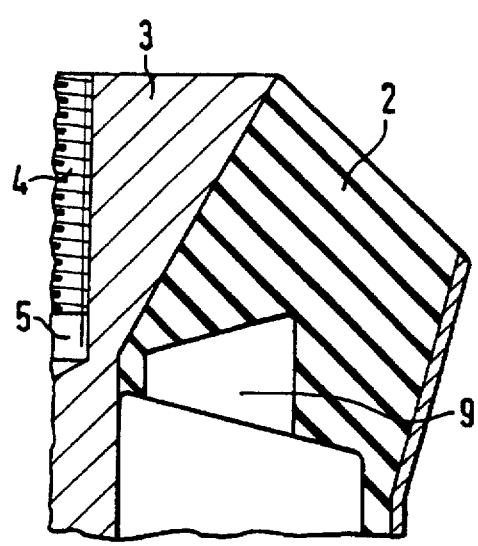
FIG. 4 shows the bearing in a partial, axial section.

FIG. 4 shows a bearing of a further embodiment differing from the previous ones in that an additional clearance 9 is present in support body 2 of bearing 1 of FIG. 4. Additional clearance 9 extends generally radially in support body 2, that is in a direction from near receiving device 3 toward the outside periphery of support body 2.

In the shown embodiment, the radial clearance evinces a lesser clearance at its inside, that is, near receiving device 3, than radially outward, that is, near the outer periphery of support body 2. As a result, bearing 1 comprising support body 2 evinces an elastic characteristic deviating from linear when radially loaded, that is transversely to the axial longitudinal direction of the support body 2. This non-linear characteristic both allows good damping and prevents shaking even at large amplitudes of perturbation, for instance, when ground roughness induces longitudinal oscillations in the direction of travel and thereby entails dynamic loads.

Moreover, for such resulting radial displacements, radial clearance 9 opposes partial overstretching of support body 2 and the ensuing tensions and to that extent it acts as a relief channel opposing overloading that would shorten the life of bearing 1.

Axial cavities 8 are present in the direction of the observer behind radial clearance 9 of bearing 1 of FIG. 1 which control the elastic characteristics of bearing 1 but which are not seen in the shown partial axial longitudinal section of the bearing 1 in this selected representation.

Figure 5:
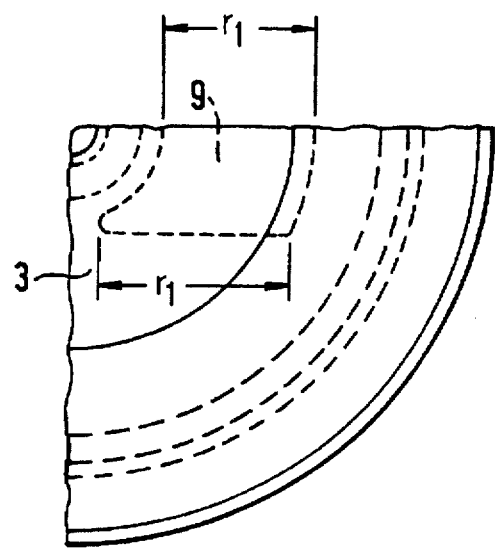
FIG. 5 is a topview of the bearing of FIG. 4.

FIG. 5 is a topview of bearing 1 of FIG. 4. Radial clearance 9 of the embodiment of FIGS. 4 and 5 is of constant radial $r_1$ width within its radial dimension but because of its varying height evinces at its inside periphery or outside periphery a cross-sectional area monotonely increasing from the inside to the outside periphery of radial clearance 9.

Figure 6:
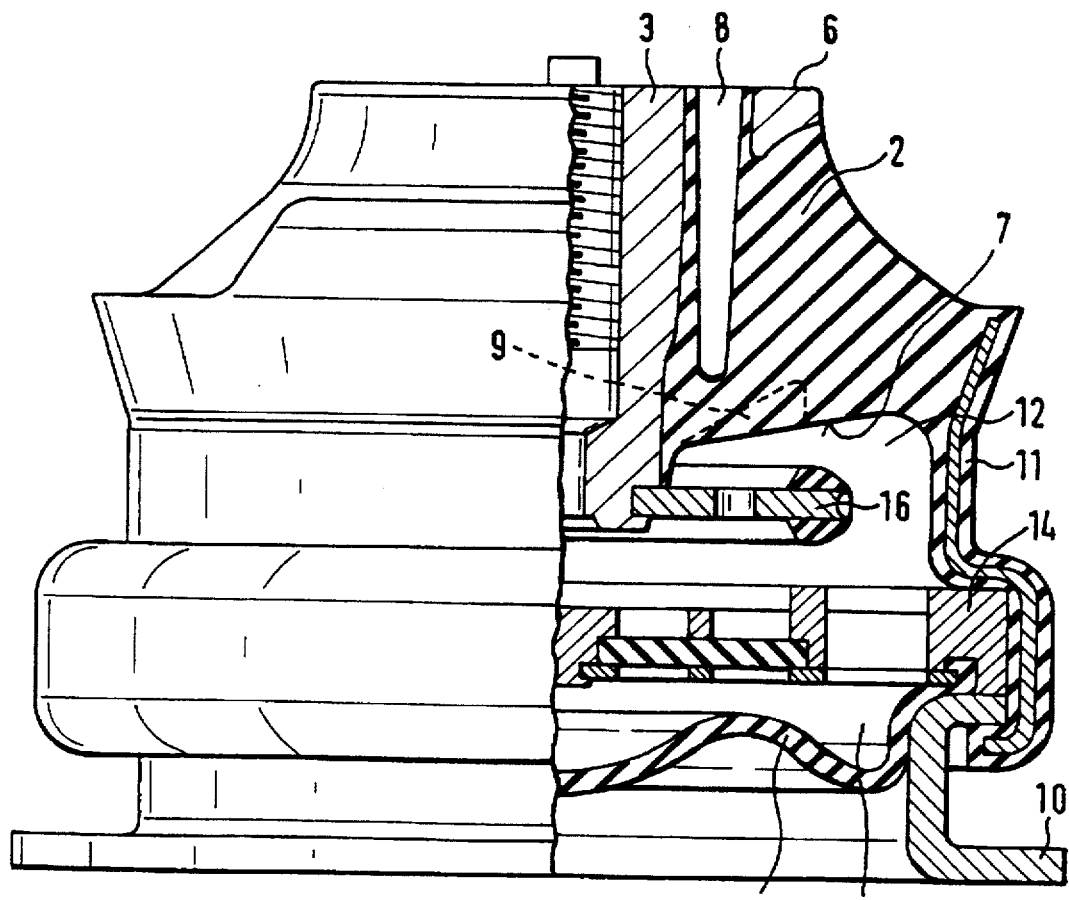
FIG. 6 is a hydraulic bearing with the partly sectioned support body.

FIG. 6 shows a bearing 1 comprising a body spring 2 designed as a hydraulically damped engine bearing, namely as a so-called hydraulic bearing.

Bearing 1 of FIG. 6 evinces a generally rotationally symmetric structure and comprises a receiving device 3 facing an engine (not shown) and enclosed by support body 2 which again is present in a multi-part, pot-shaped housing 11 with a connecting flange 10.

An operational chamber 12 is disposed in the space of housing 11 underneath support body 2 and may contain a fluid.

The operational chamber 12 is isolated from an equalizing chamber 13 also present in housing 11, the isolating means being a device 14 fitted as called for with flow-transmitting means such as annular channels comprising transmission control valves and the like, whereby, when bearing 1 is under load, deformation of support body 2 entails a rise in pressure in the fluid present in operational chamber 12, the rise in fluid pressure being balanced by the fluid flowing through the annular channel in device 14 into equalizing chamber 13 wherein the pressure rise thus taking place is balanced by a deformation in membrane 15 externally sealing equalizing chamber 13.

A displacement disk 16 is mounted underneath support body 2 and enhances the desired work of damping since it is mounted within the fluid-filled operational chamber 12, whereby frictional work is performed when the displacement disk is displaced. As easily noted from FIG. 6, a radial clearance 9 is present in the area of face 7 of support body opposite face 6 and acts as a relief channel to ensure long life of the bearing 1 comprising the support body 2, as thereby partial overstretching and hence excessive tensions of support body 2 are averted when bearing 1 is loaded radially.

Bearing 1 comprising support body 2 offers the advantage that the cavities running through the axial longitudinal direction of support body 2 and the radial clearances substantially transverse thereto, namely, running substantially in the radial direction of body 2, permit adjustment of the axial and radial elastic characteristics of bearing 1, without the need for an inserted ring required in conventional bearings. This very unusual design of the invention allows adjustment of any possible radial/axial elastic characteristic. This design also eliminates the insert ring of the state of the art, and as a result the overall stress level is low because the insert-ring shearing stresses are absent.

The array of cavities 8 in the axial longitudinal direction of support body 2 lowers the susceptibility to swelling in support body 2 and as a result higher overall work of dissipation is achieved. The elimination of the insert ring advantageously shifts the natural oscillatory frequency of the support body to higher frequencies, so that, at lower frequencies of perturbation, coupling is avoided and hence also resonant or near-resonant oscillation of the oscillatory system of engine and bearing, and consequently sustained, degradation of the bearing of the invention is reliably averted.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A bearing for damping oscillatory masses, comprising:

a rubber-elastic support body (2) including an outer surface;

a receiving device (3) mounted to the support body (2) to connect the bearing to the oscillatory mass; and a housing (11) bracing the bearing body in frictionally locking manner to a mount;

wherein the support body (2) includes at least one cavity defined by at least one outer wall, wherein the wall extends substantially in an axial direction of the support body such that when the bearing is loaded statically, the outer wall(s) of the clearance remain mutually apart.

2. The bearing of claim 1, wherein each one the at least one cavity is formed by substantially circular-cylindrical cavities (8) extending from one face (6) of the support body (2) toward the opposite face (7) and arranged around the receiving device (3).

3. The bearing of claim 2, wherein the cavities are arrayed along an arc of a circle in the support body (2).

4. The bearing of claim 2, wherein at least one radially outward clearance (9) is disposed at the opposite face (7) in such manner that the radially outward clearance (9) is angularly offset in the axial direction of the support body (2) relative to the cavities (8) extending in the axial longitudinal direction of the support body (2).

5. The bearing of claim 4 wherein the radial cavity (9) extends radially from the vicinity of the receiving device (3) in the support body (2), and wherein a radially inward wall of the radial cavity is of a different height as a radially outer wall of the radial cavity.

6. The bearing of claim 4, wherein the radial cavity (9) evinces a same cross-sectional area near the receiving device (3) as the vicinity of the outer surface of the support body (2).

7. The bearing of claim 4, wherein the radial cavity (9) evinces a different, cross-sectional area near the receiving device (3) than the vicinity of the outer surface of the support body (2).

8. The bearing of claim 1, wherein the bearing is a hydraulically damped bearing.

* * * * *